Dec. 26, 1950  J. H. WRIGHT  2,535,619
EDUCATIONAL TOY
Filed Aug. 2, 1949

INVENTOR.
JOHN H. WRIGHT
BY McKnight and Comstock
ATTORNEY

Patented Dec. 26, 1950

2,535,619

UNITED STATES PATENT OFFICE 2,535,619

EDUCATIONAL TOY

John H. Wright, Chicago, Ill.

Application August 2, 1949, Serial No. 108,075

1 Claim. (Cl. 35—42)

My invention relates to a toy adapted to have educational value as well as provide amusement and entertainment for the child.

Among the objects of my invention is to provide a toy having parts adapted to be associated in a certain order and so constructed as to teach the child the proper association of these parts; to create a toy that will enable a child to try his own ingenuity in the association of related parts and to correct the child when wrong and also to enable the child to finally complete the problem of the proper association of parts.

Another object of my invention is to provide an upstanding member on each piece which serves as a handle or lifting member for handling the piece and inserting it into its proper place. The upstanding member is also an indicia of its proper place in the toy and provides association training for the child in suggesting where the piece belongs in the toy.

My invention also contemplates such other objects, advantages and capabilities as will later more fully appear and which are inherently possessed by my invention.

While I have disclosed herein a preferred embodiment of my invention, yet I wish it understood that the same is susceptible of modification and change without departing from the spirit of my invention.

Figure 1:
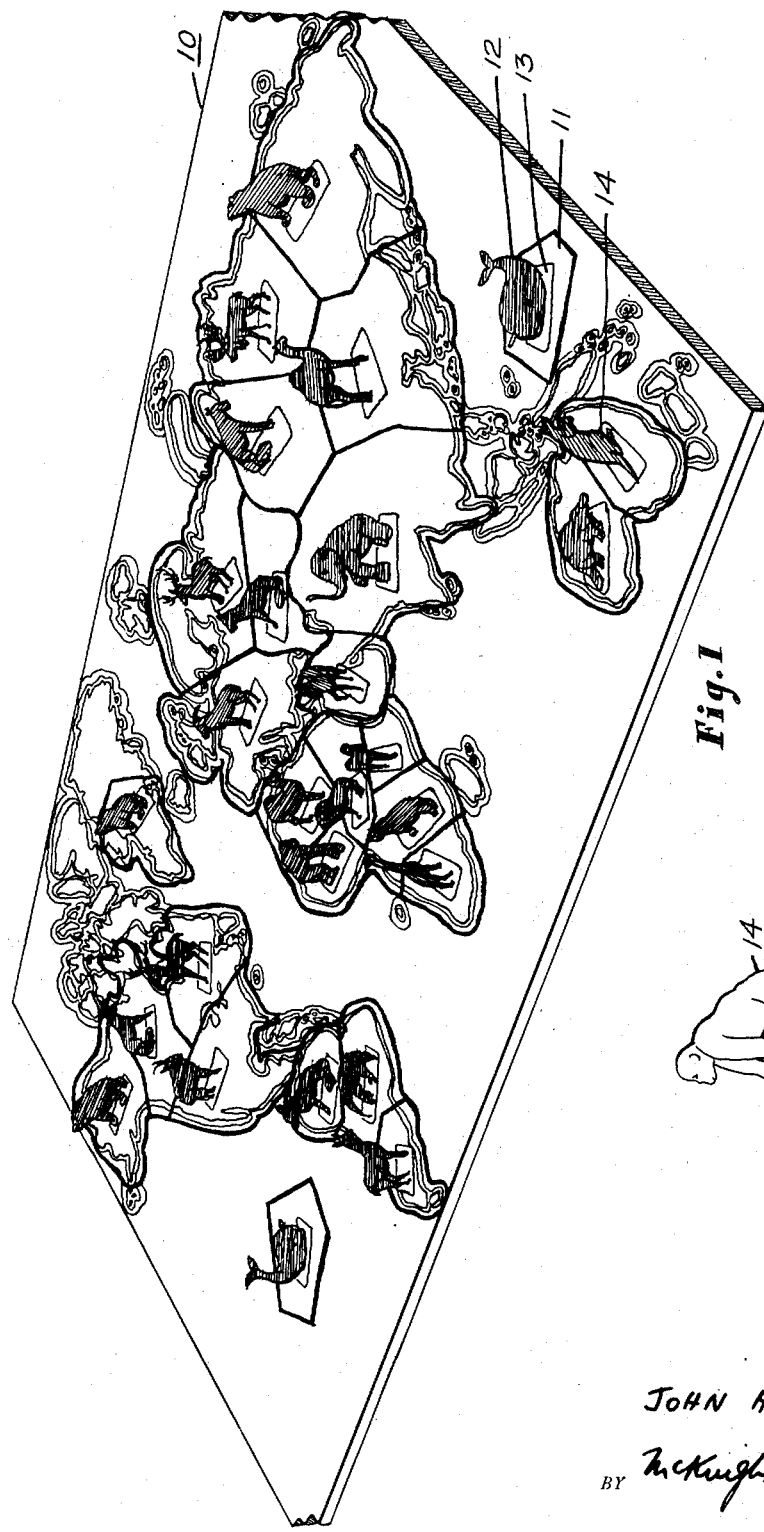
Figure 2:
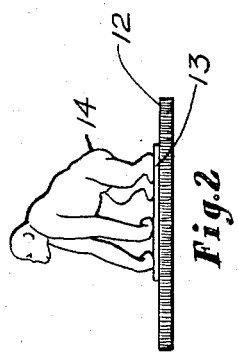

Referring to the drawings, Fig. 1 is a perspective view of my toy partly broken away at two of the corners; and Fig. 2 is a front elevational view of one of my pieces or segments with an upright member.

Referring more particularly to the embodiment selected to illustrate my invention, it comprises a board 10, preferably formed of thick cardboard or other suitable material. The board 10 is adapted to lie horizontally in a flat position on a table or other support. On the board 10 is drawn a map of the continents of the world, North America, South America, Europe, Asia, Africa and Australia, the island of Greenland and some of the islands in the South Seas.

The continents are divided into segments 11 and such segments are cut through the board to form separate pieces. The islands form entire segments 11 and are likewise cut out of the board so as to be separable therefrom. The segments in general follow the peculiar geographical lines of the continents and islands and therefore are characterized by such distinctive geographical lines.

A plurality of upright or vertically extending members 12 is provided, each of which has a platform 13 on which is mounted the lower extremeties or portion of an upright figure 14, preferably in the form of an animal.

One upright member 12 is attached to each segment 11 with platform 13 attached to the upper surface of segment 11.

The figure 14 is in the form of an animal indigenous to the area of the continent or island represented by the segment. For instance, an elephant figure 14 is provided for that portion of Asia in which elephants are native, such as India. A polar bear figure 14 is provided for the segment representing the island of Greenland, since polar bears are indigenous to Greenland.

In use, the segments 11 are separated from board 10 and mixed up. The child then begins to assemble the pieces 11 into their proper positions. The shapes of the segments furnish hints as to their relationship and association. A child who has training in geography will be helped by the geographical lines of the units 11. Once he puts them in place, he will tend to remember them for future placement and will learn the geographical contours of the continents and islands.

The animals on the uprights give further information to the child and hint their location. Soon a child gets to know that a polar bear is associated with cold places and an elephant with warm places. This eliminates certain positionings and suggests other placements. By using applicant's toy, the child learns association of animals with places. In addition, the upright animal acts as a convenient handle in assembling the toy to completion, because the child may grasp each upright with his fingers and position it in its proper place. The uprights not only aid in positioning but save the segments from being torn or worn out at the edges from handling.

My upright members 12 may be removably or permanently attached to segments 11. There also may be more than one upright member for each segment. The figure on the upright member need not necessarily be in the shape of an animal, nor need my body member be limited to the outline of a map of the world. My board may have other drawings thereon and my figures on the upright members may be in any form that will suggest association in meaning with the segment to which it is attached or attachable.

Having thus described my invention, I claim:

An educational toy comprising a thick cardboard body member adapted to lie horizontally in a flat position on a table, said body member having drawn thereon the continents and larger islands of the world, a plurality of segments cut out from said body member and removable from and returnable to said body member, said segments following substantially the geographical lines of the continents and islands, and a plurality of upright members, each of said upright members having a platform at its lower end and an animal figure attached to said platform and extending vertically thereabove, each of said upright members having its platform attached to one of said segments, each of the vertically extending portions of said upright members adapted to be used as a handle and each of the vertically extending portions of said upright members having an animal figure characteristic of the geographical area represented by the segment to which it is attached to aid in replacing each segment in its proper place in the body member.

JOHN H. WRIGHT.

REFERENCES CITED

The following references are of record in the file of this patent:

UNITED STATES PATENTS

| Number | Name | Date |
|---|---|---|
| 650,320 | Hepfinger | May 22, 1900 |
| 1,071,358 | Matthews | Aug. 26, 1913 |
| 1,084,370 | Smith | Jan. 13, 1914 |
| 1,506,979 | Foulks | Sept. 2, 1924 |
| 1,629,582 | McClintock | May 24, 1927 |

FOREIGN PATENTS

| Number | Country | Date |
|---|---|---|
| 170,231 | Great Britain | Oct. 20, 1921 |
| 280,278 | Great Britain | Nov. 10, 1927 |